United States Patent [19]

Kamada et al.

[11] Patent Number: 4,980,842

[45] Date of Patent: Dec. 25, 1990

[54] METHOD AND APPARATUS FOR REGISTERING AND RETRIEVING PRIMARY INFORMATION ON THE BASIS OF SECONDARY INFORMATION

[75] Inventors: Hiroshi Kamada, Yamatokoriyama; Sumio Kita, Nara; Yuji Katsuta, Yamatokoriyama; Sakuharu Takano, Nara, all of Japan

[73] Assignee: Sharp Kabushiki Kaisha, Osaka, Japan

[21] Appl. No.: 222,037

[22] Filed: Jul. 21, 1988

[30] Foreign Application Priority Data

Jul. 23, 1987 [JP] Japan .............................. 62-186460
Jul. 23, 1987 [JP] Japan .............................. 62-186462

[51] Int. Cl.$^5$ ............................................. G06F 12/00
[52] U.S. Cl. .................................. 364/518; 364/200; 364/255; 364/255.8; 364/256.8
[58] Field of Search ............................ 364/518, 521

[56] References Cited

U.S. PATENT DOCUMENTS 4,803,614  2/1989  Banba et al. ................... 364/200

Primary Examiner—Dale M. Shaw
Assistant Examiner—Mark K. Zimmerman

[57] ABSTRACT

In an information registering and retrieving apparatus, primary information of image signals converted from an original document or documents is registered by adding secondary information to the primary information and any desired primary information is retrieved by utilizing the secondary information. The apparatus is provided with a first output reservation device for storing, in a storage device, desired secondary information designated in the entire secondary information retrieved on the basis of any given retrieval condition and for interrupting an output of the desired primary information corresponding to the designated secondary information on a display and by a printer. It is further provided with a second output reservation device for storing, in the storage device, desired primary information designated in the entire primary information corresponding to the retrieved secondary information and for interrupting an output of the desired primary information by the printer. In this apparatus, upon completion of retrieval processing, the primary information which has not been outputted yet is outputted on the basis of the information stored in the storage device.

5 Claims, 7 Drawing Sheets

Fig. 2a

```
CASSETTE NO.
DATE OF REGIST.
MATERIAL NO.
TITLE
COMPANY NAME

KEYWORD
```

Fig. 2b

```
<1>
CASSETTE NO.     0001
DATE OF REGIST.  19851030
MATERIAL NO.     2239
TITLE            TEST 1
COMPANY NAME     SHARP

KEYWORD          ELECT. FILE

<2>
CASSETTE NO.     0001
DATE OF REGIST   19851028
MATERIAL NO.     2173
TITLE            TEST 2
COMPANY NAME     SHARP

KEYWORD          ELECT. FILE
                 PHOTO-MAGNE. DISK
```

Fig. 2c

```
<1>
CASSETTE NO.     0001
DATE OF REGIST.  19851030
MATERIAL NO.     2239
TITLE            TEST 1
COMPANY NAME     SHARP

KEYWORD          ELECT. FILE
<2>
CASSETTE NO.     0001
DATE OF REGIST.  19851028
MATERIAL NO.     2178
TITLE            TEST 2
COMPANY NAME     SHARP

KEYWORD  ELECT. FILE
         PHOTO-MAGNE. DISK
```

Fig. 2d

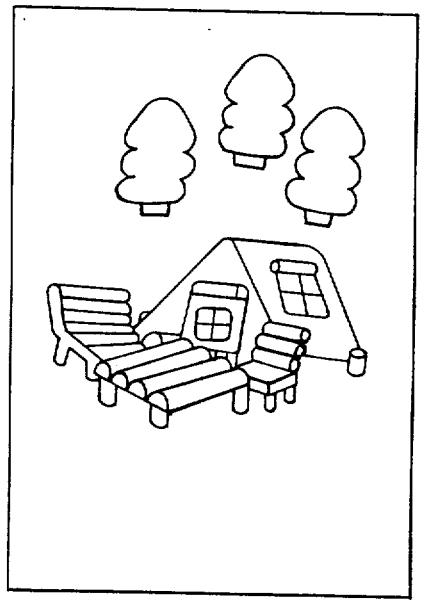

METHOD AND APPARATUS FOR REGISTERING AND RETRIEVING PRIMARY INFORMATION ON THE BASIS OF SECONDARY INFORMATION

BACKGROUND OF THE INVENTION

1. Field of the Invention

The present invention generally relates to an information processing apparatus, and more particularly, to an apparatus for registering therein and retrieving image information obtained by converting the contents of a document, a drawing or the like into image signals.

2. Description of the Background Art

Conventionally, an electronic filing apparatus is known as one of the information registering and retrieving apparatuses. In the electronic filing apparatus, an original document or plural documents are initially read by a scanner to be converted into image signals under the control of a CPU so that the image signals may be stored therein as primary information. The primary information is then supplemented by secondary information such as a keyword or similar information for retrieving the primary information. The secondary information is inputted into a storage device upon operation of a keyboard or similar input device to be registered and stored therein. On the basis of retrieval conditions of the secondary information to be inputted by the keyboard, the corresponding primary information is retrieved from various information stored in the storage device so that desired primary information may be represented on a display and printed by a printer.

Register processing by the electronic filing apparatus is illustrated in a flow-chart of FIG. 1.

Using a function key provided on the keyboard, a registration mode is set as a processing mode at step m11 followed by step m12 at which the secondary information, corresponding to the primary information to be registered, is inputted using character keys or the like provided on the keyboard. At step m13, an original document is read by the scanner and converted into the image signals, which are inputted as the primary information. It is judged at step m14 whether or not there exists another document to be registered. If there exists another document, the procedure returns to step m13 until all the documents to be registered are entirely inputted as primary information. After the primary information corresponding to the aforementioned secondary information has been completely inputted, the procedure proceeds to step m15 at which time the primary information is supplemented by the secondary information upon depression of a register key provided on the keyboard. Thus, the entire information may be registered and stored in the storage device. Finally, it is judged at step m16 whether or not there exists other primary information to be registered. If there exists other primary information, the procedure returns to step m12 followed by steps m13 to m15 at which time the secondary information, together with the corresponding primary information, is inputted into and registered in the storage device. If it is judged at step m16 that there exists no further primary information to be registered, the procedure ends.

However, in the registration processing with the use of the conventional electronic filing apparatus, whenever each piece of the secondary information is manually inputted by the keyboard, the corresponding primary information is required to be inputted by the scanner. Because of this, an operator must be in constant attendance at the apparatus to input the necessary secondary information until the primary information is entirely registered. Accordingly, the operator is under that restriction, even during the input of the primary information to be performed by the scanner, which does not necessarily require the operator to be present. In addition, a complicated operation requires a lot of time for registration, thus resulting disadvantageously in relatively low working efficiency.

During the retrieval operation of the conventional electronic filing apparatus, a retrieval mode is initially selected upon depression of the function key by the operator. In this event, guidance information, required for a setting retrieval condition or conditions, is represented on the display, as shown in FIG. 2a. The operator inputs, for example, "electronic filing apparatus" as a name of article of commerce into an item "keyword" using a cursor key and the character keys and then depresses a retrieval key. This operation causes the apparatus to initiate the retrieval processing and to represent a table of the secondary information matching the retrieval conditions on the display, as shown in FIG. 2b. This table shows indexes of the primary information containing a test result with respect to the "electronic filing apparatus" of each company. After the operator has inserted a cassette (refer to FIG. 2c) storing therein the test result on the basis of the cassette number in the indexes, he can selectively designate material No. <1> using the cursor key. As a result, the electronic filing apparatus represents the test result of the designated material No. <1>, on the display, as an image with an image quality, as shown in FIG. 2d, and prints it on a record sheet of a printer.

Furthermore, the electronic filing apparatus is provided with a pre-processing function and a next-page processing function. When the table of the secondary information, as shown in FIG. 2b, is being displayed, the pre-processing function can return, upon depression of a "pre-processing" key, the control condition to the retrieval condition setting step, as shown in FIG. 2a, immediately previous to the step of representing the table of the secondary information. Likewise, when the primary information is being displayed as shown in FIG. 2d, the pre-processing function can return the control condition to the step of representing the table of the secondary information as shown in FIG. 2b. On the other hand, in the case where there exist plural pages of the primary information corresponding to a piece of the secondary information, the next-page processing function causes an image of the page next to the image of FIG. 2d to be displayed and printed, upon depression of a "next-page" key.

It is true that the pre-processing and next-page processing functions really facilitate the retrieval operation in the conventional apparatus. However, the material number of the desired primary information is required to be initially designated on the basis of the table of the secondary information retrieved in accordance with the retrieval conditions. The designated primary information is then represented on the display and printed by the printer. The retrieval is executed by repeating the above described processing operations. Accordingly, whenever the display and the printing of the primary information (FIG. 2d), having the designated material number, are brought to completion, the table of the secondary information shown in FIG. 2b appears on the display and the operator is requested to select the next material number on each occasion. This is not so serious in the case where the number of materials to be retrieved are relatively few. However, when a large number of materials are required to be retrieved, the selecting operation becomes bothersome. Particularly, in the case where the operator can guess the contents of the primary information from the table of the secondary information, almost useless primary information is successively displayed alternately with the table of the secondary information. This is disadvantageous in that the retrieval operation can not be efficiently performed.

SUMMARY OF THE INVENTION

Accordingly, the present invention has been developed with a view to substantially eliminating the above described disadvantages inherent in the previous information registering and retrieving apparatuses, and has, for its essential object, an improved information registering and retrieving apparatus in which the operation for registering is simplified and can be efficiently performed by separately inputting primary information and secondary information required for retrieving the primary information.

Another important object of the present invention is to provide an information registering and retrieving apparatus of the above described type in which the operation for retrieval can be speedily performed with a reduction in labor. To this end, after a series of operations for retrieval have been successively performed on the basis of the secondary information, the secondary information selectively designated by the retrieval is collectively outputted to a display and a printer, independently of the previous operations for retrieval.

To accomplish these and other objects, in the information registering and retrieving apparatus according to one preferred embodiment of the present invention, the primary information of image signals converted from an original document or documents is registered by adding secondary information to the primary information and any desired primary information is retrieved with the use of the secondary information.

The primary and secondary information is registered in the information registering and retrieving apparatus in accordance with the following steps:
- a primary information batch-storing step for collectively stores the primary information of image signals in a storage device;
- a primary information selecting step for selecting desired primary information corresponding to any particular secondary information in the entire primary information which is stored in the storage device and successively displayed on a display during the selection on the basis of the secondary information stored in the storage device; and
- an information batch-registering step for collectively registering the selected primary information together with the secondary information added thereto in the storage device.

According to the above described steps, the primary information and the secondary information for retrieving the first information can be inputted separately from each other.

In the primary information batch-storing step, a plurality of original documents are initially converted into the primary information of image signals by a scanner or the like to be collectively stored in the storage device. In the subsequent primary information selecting step, an operator inputs the particular secondary information with the use of a keyboard or the like to store it in the storage device. The operator then selectively designates the desired primary information corresponding to the aforementioned secondary information from the entire primary information stored in the storage device and successively represented on the display. In the information batch-registering step, the selected primary information is supplemented by the secondary information and is collectively stored together therewith in the storage device. In this way, the input of the primary information which can be automatically executed by the scanner or the like can be separated from that of the secondary information which requires the operator.

Furthermore, the information registering and retrieving apparatus of the present invention includes a first output reservation means and a second output reservation means. The first output reservation means stores in a storage device desired secondary information designated out of the entire secondary information retrieved on the basis of any given retrieval condition and interrupts an output of the desired primary information corresponding to the designated secondary information on a display and by a printer. The second output reservation means stores, in the storage device, desired primary information designated in the entire primary information corresponding to the retrieved secondary information and interrupts an output of the desired primary information by the printer.

By the above described constitution of the present invention, the primary information which has not been outputted yet is outputted, upon completion of retrieval processing, on the basis of the information stored in the storage device.

The first output reservation means stores the secondary information selectively designated by the operator in the storage device when the table of the secondary information is represented on the display on the basis of the retrieval condition and interrupts the output of the primary information corresponding to the designated secondary information on the display and by the printer. The second output reservation means stores the primary information designated by the operator when the primary information corresponding to the retrieved secondary information is displayed on the display and interrupts the output of the primary information by the printer.

Upon completion of a series of retrieval operations, the first and second output reservation means collectively output the primary information, the output of which has been temporarily interrupted, on the display and/or the printer on the basis of the information stored in the storage device.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals and wherein;

FIGS. 2a to 2d show various displaying conditions represented on a display provided in the information registering and retrieving apparatus when the retrieval processing is being performed;

DETAILED DESCRIPTION OF THE PREFERRED EMBODIMENTS

Figure 1:
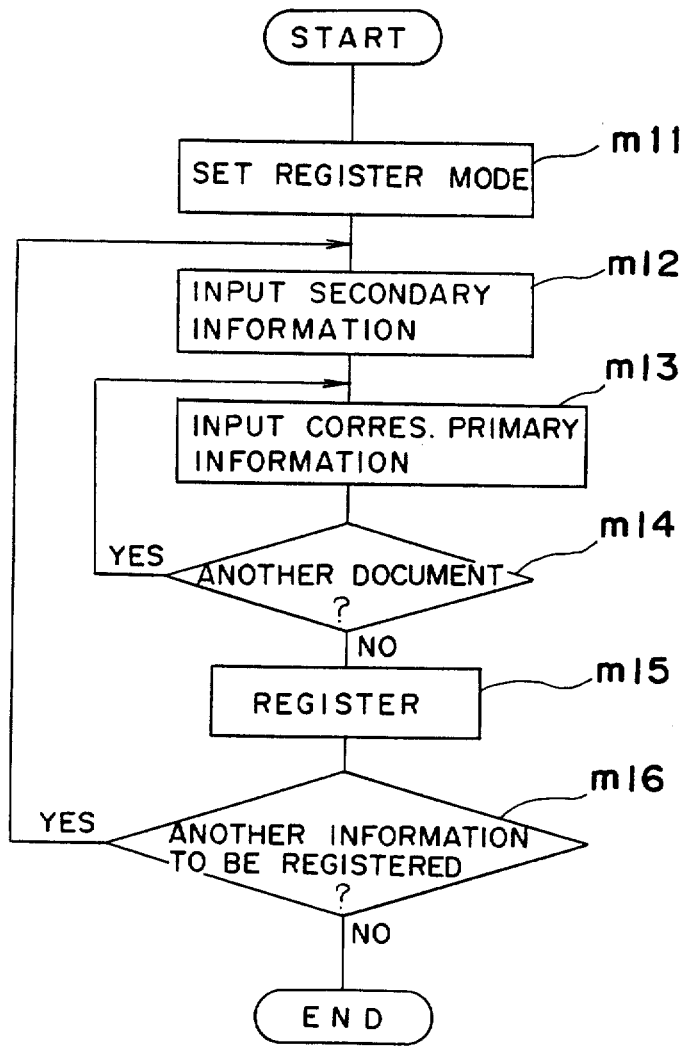
FIG. 1 is a flow-chart indicative of the register processing in the conventional information registering and retrieving apparatus.
Figure 3:
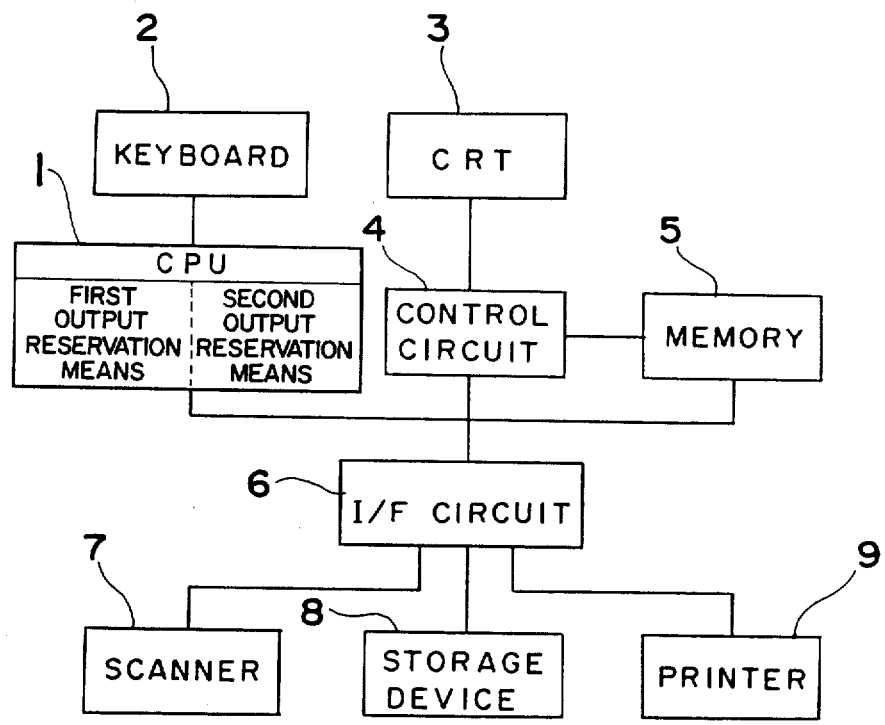
FIG. 3 is a block diagram of an electronic filing apparatus as the information registering and retrieving apparatus according to one preferred embodiment of the present invention.

FIG. 3 depicts a block diagram of an electronic filing apparatus employed as an information registering and retrieving apparatus according to one preferred embodiment of the present invention. The electronic filing apparatus is provided with a CPU 1 for registering and retrieving information, a keyboard 2 for manually inputting various orders or data, a CRT 3 for displaying the information thereon, a control circuit 4 for controlling the display of the CRT 3, a memory 4 for temporarily storing therein the information to be displayed on the CRT 3, an interface circuit 6 for coupling the CPU 1 with peripheral devices, a scanner 7 used as an input device for reading an original document to convert it into image information, a storage device 8 consisting of a photo-magnetic disc for storing therein the information to be displayed on the CRT 3 and a printer 9 for printing desired information on a recording sheet. In the apparatus of FIG. 3, the CPU 1 is coupled with the keyboard 2, the control circuit 4, the memory 5 and the interface circuit 6, with the control circuit 4 being further coupled with the CRT 3 and the memory 5. The interface circuit 6 couples the CPU 1, the control circuit 4 and the memory 5 with the scanner 7, the storage device 8 and the printer 9. The CPU 1 is provided with the first and second output reservation means and controls the entire electronic filing apparatus in accordance with a certain program to register and retrieve the information. The first and second output reservation means will be discussed later. The CRT 3 displays primary information of image information, secondary information of, for example, a keyword and the like required for retrieving the primary information and guidance information for setting a retrieval condition or conditions. The printer 9 is employed as an output device for printing the retrieved primary information on the recording sheet. The keyboard 2 has a plurality of keys, for example, a cursor key, a function key, character keys, a register key, a primary information selecting key, a next-information key, a retrieval mode key, a pre-processing key, a reservation key, a print reservation key, a display reservation key, a retrieval end key, a next-page key, a previous-page key, a next-document key, a previous-document key, a reservation cancel key and the like.

Figure 4:
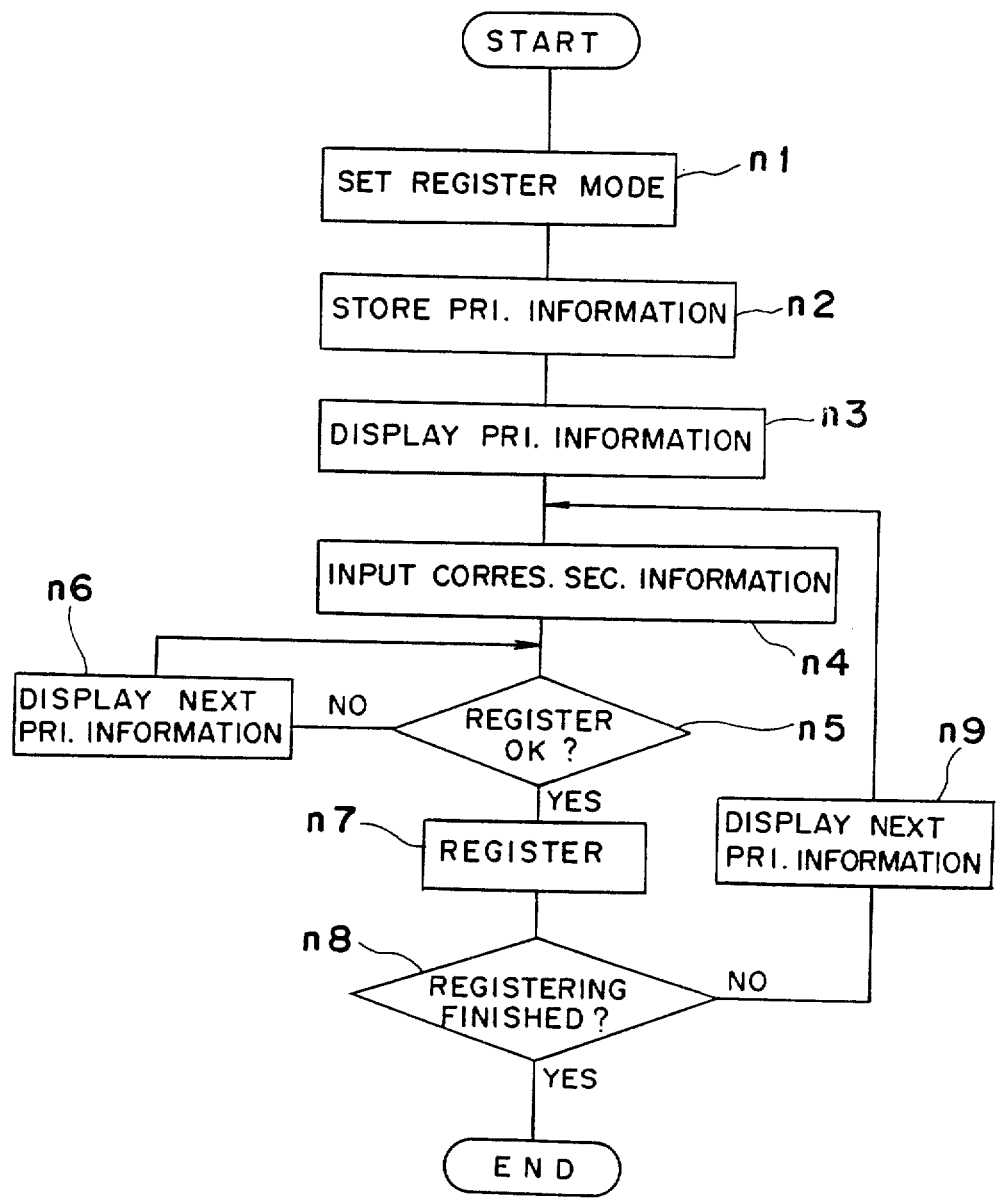
FIG. 4 is a flow-chart indicative of the register processing in the apparatus of FIG. 4.

FIG. 4 depicts a flow-chart showing how to register the information under the control of the CPU 1.

At step n1, upon operation of the function key by an operator, the processing mode is initially set to a registering mode. A plurality of original documents are converted into the primary information of image signals by the scanner 7 and collectively stored in the storage device 8 at step n2, which is therefore called a primary information batch-storing step.

A first piece of the primary information stored in the storage device 8 is displayed on the CRT 3 at step n3. At step n4, the operator inputs suitable secondary information corresponding to the displayed primary information using the character keys and the like so that the inputted secondary information may be stored in the storage device 8. These steps n3 and n4 constitute a former half of primary information selection processing.

At step n5, the operator depresses the primary information selecting key to select the primary information being now displayed on the CRT 3 with respect to the secondary information inputted at the previous step. The CPU 1 renders the CRT 3 to display thereon the next primary information stored in the storage device 8 at step n6. If the displayed primary information should be selected, the operator is requested to again depress the primary information selecting key at step n5. Otherwise, the operator is requested to depress the next information key. In either case, the next primary information is displayed on the CRT 3. In this way, the entire primary information appropriate to the given secondary information is selected, thus ending a latter half of the primary information selection processing.

At step n7 which is the step of information batch-register processing, the operator depresses the register key so that the CPU 1 may add the secondary information to the selected primary information to collectively store and register them in the storage device 8.

The CPU 1 judges, at step n8, whether or not the registering should be continued by judging whether or not the register mode is being set by the function key. If it has been judged that the registering should be continued, the procedure proceeds to step n9 at which time the primary information, to which any secondary information is not yet added, is displayed on the CRT 3. The procedure then returns to step n4 in preparation for the input of new secondary information. If it has not been judged at step n8 that the registering should be continued, the register processing ends.

As described above, the primary information, which is the image information of the original document or documents, is automatically collectively inputted by the scanner at steps n1 and n2. Upon subsequent key operation performed by the operator, appropriate primary information is so selected so as to match each piece of the secondary information at steps n4, n5 and n6. This is followed by step n7 at which time the secondary information is added to the selected primary information and is collectively registered in the storage device 8. Accordingly, the automatic input of all of the primary information and the manual input of the secondary information by the operator for retrieving the primary information can be separated from each other during the registration processing. Furthermore, since all of the primary information corresponding to a single piece of secondary information can be collectively selected and registered, the operator is not requested to attend to the inputting of the primary information. Consequently, the registration operation in the electronic filing apparatus of the present invention is remarkably simplified and can be effectively performed, as compared to that of the conventional apparatus.

Furthermore, the CPU 1 is provided with the pre-processing function and the next-page processing function described hereinbefore, as in the conventional apparatus.

In the electronic filing apparatus of the present invention, however, when a table of secondary information, retrieved in accordance with the retrieval conditions, is displayed on the CRT 3 (step s5 in FIG. 5a), as shown in FIG. 2b, the operator can successively selectively designate desired secondary information i.e. the material number (refer to <1> and <2> in FIG. 2b), using the cursor key and the reservation key. Thus, the selected secondary information may be stored in the storage device 8 for the output reservation of the corresponding primary information (steps s6 and s7 in FIG. 5a). The first output reservation means is serviceable for this purpose and halts the output of the primary information corresponding to the desired material number on the CRT 3 and by the printer 9.

On the other hand, the second output reservation means of the CPU 1 functions as follows.

The operator selects a desired material number in the table of the secondary information displayed on the CRT 3, as shown in FIG. 2b, and inserts, into the electronic filing apparatus, a cassette storing therein the desired material, as shown in FIG. 2c. The desired material number is then designated using the cursor key or the like (step s12 in FIG. 5c). When the primary information of the designated material is being displayed on the CRT 3 (step s13 in FIG. 5c), as shown in FIG. 2d, the primary information will be stored, upon depression of the reservation key by the operator, in the storage device 8 for the output reservation thereof (steps S14 and S15 in FIG. 5c). On this occasion, the output of the primary information by the printer is suspended. Upon completion of a series of retrieval operations, the CPU 1 causes the CRT 3 and the printer 9, respectively, to collectively display and print the primary information corresponding to the secondary information having the output reservation performed at the aforementioned step s7 (steps 21 to 30 in FIG. 5b). In this event, the primary information having the output reservation performed at step s14 is also printed by the printer 9 (step S32 in FIG. 5b).

Figure 5A:
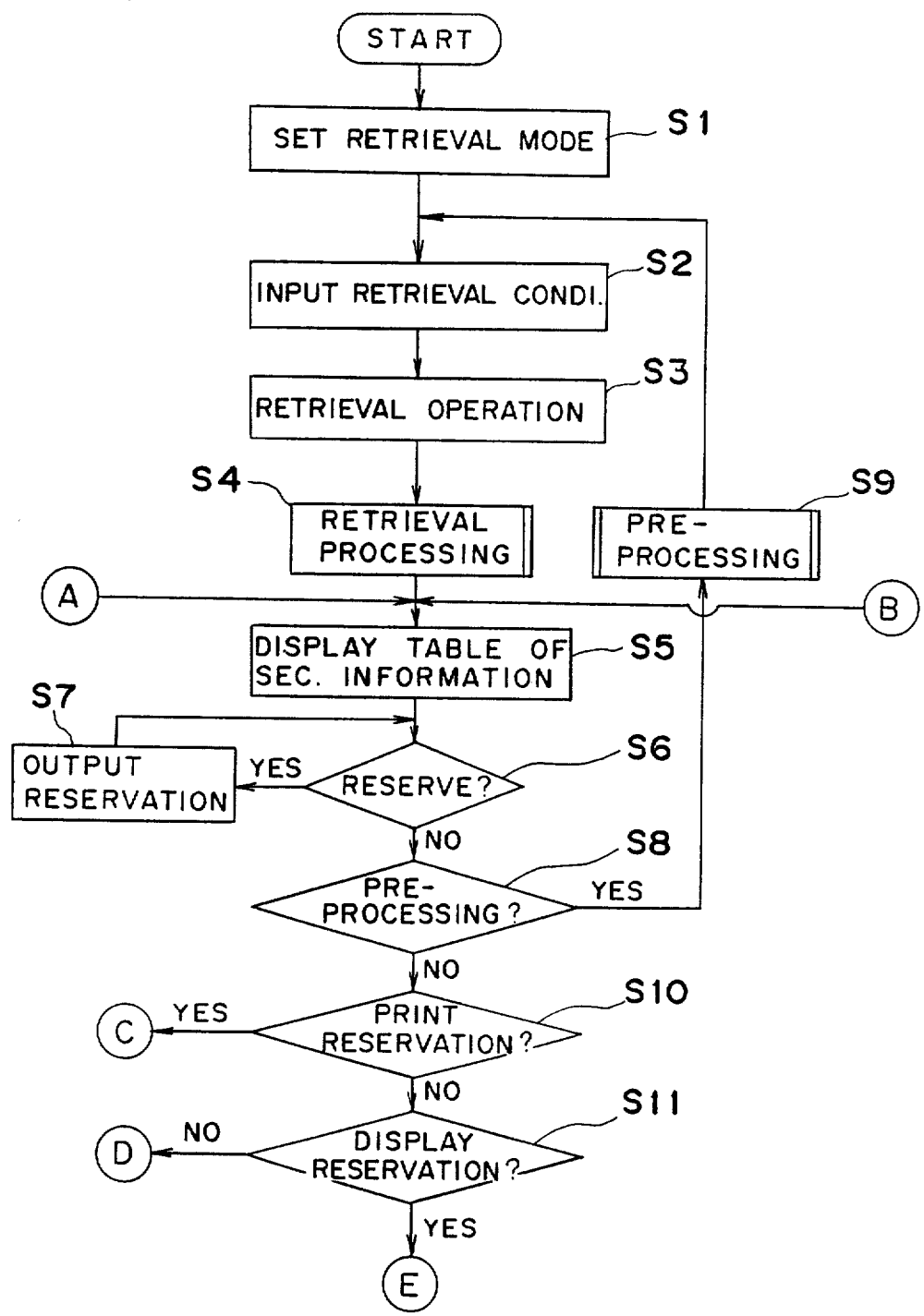
FIGS. 5a to 5c are a flow-chart indicative of the retrieval processing in the apparatus of FIG. 4.
Figure 5B:
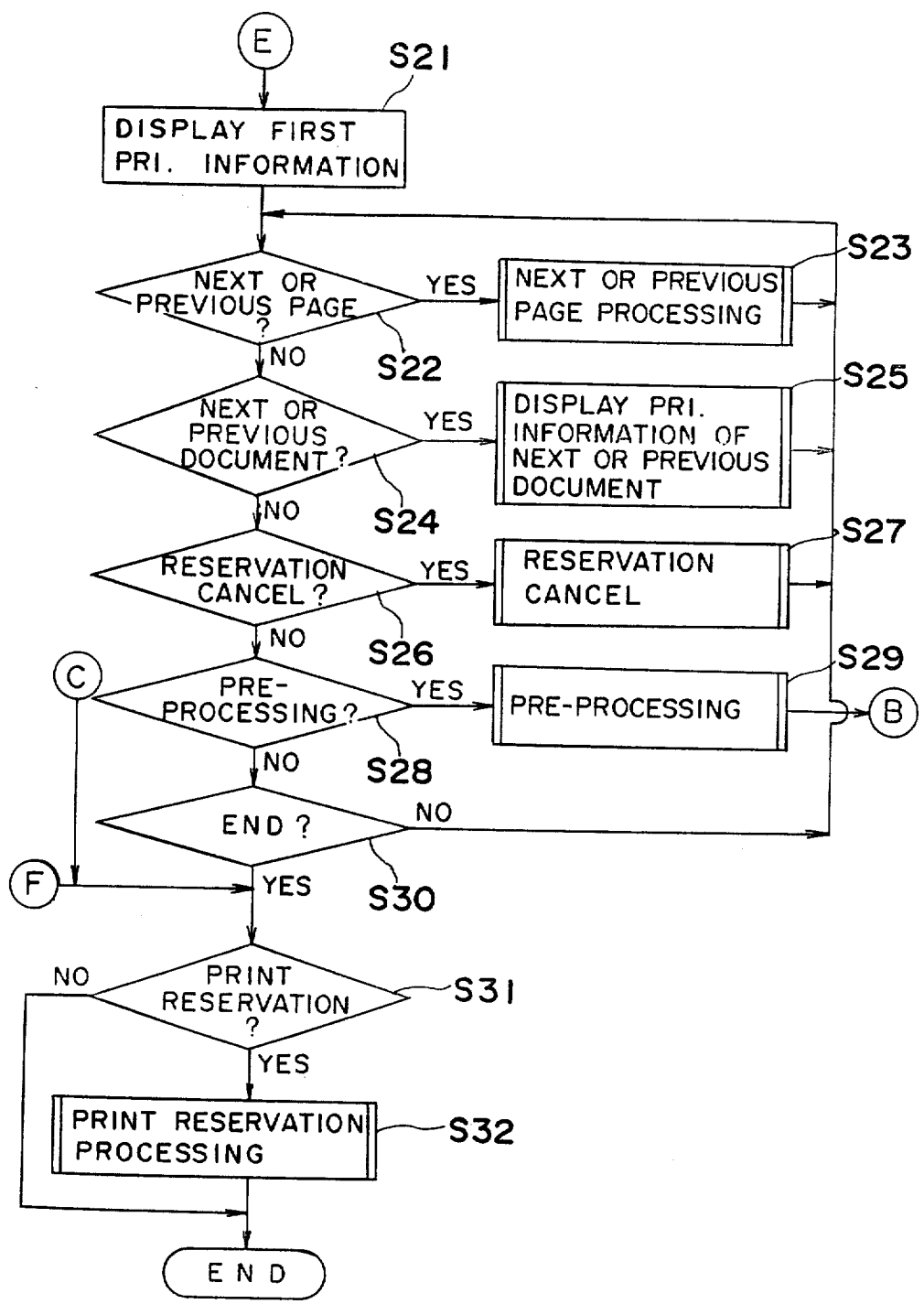
Figure 5C:
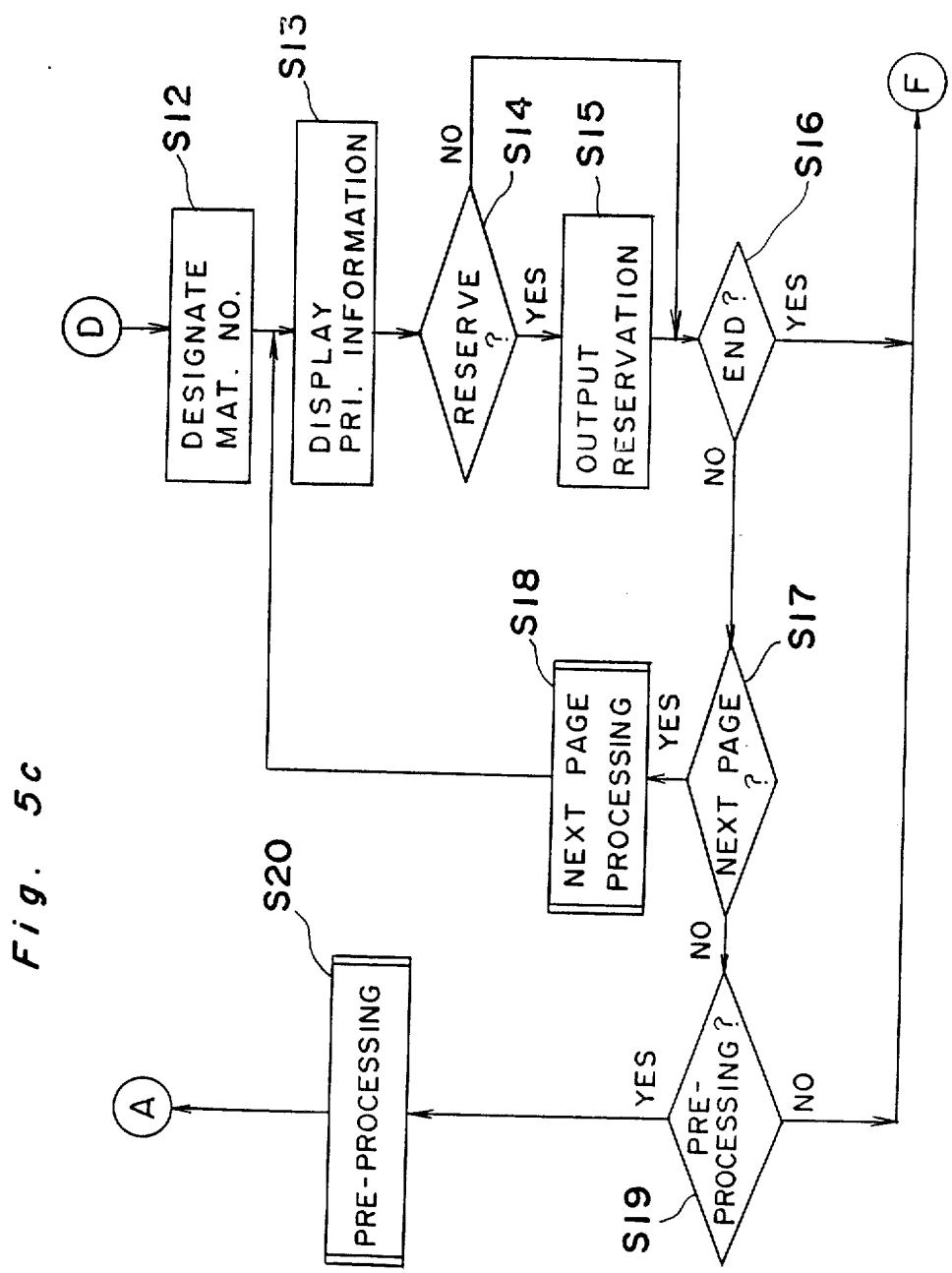

With reference to a flow-chart of FIGS. 5a to 5c, the retrieval processing to be performed in the apparatus of the present invention will be hereinafter explained.

After the retrieval mode key has been turned on, the processing mode is set to a retrieval mode at step s1.

The guidance information shown in FIG. 2a is displayed on the CRT 3, and at step s2, a certain retrieval condition or conditions are inputted into the corresponding items using the cursor key and the character keys. For example, the name of an article "electronic filing apparatus" is inputted into the item of keyword. When the operator has ordered the retrieval operation using the keyboard 2 at step s3, the CPU 3 retrieves and reads, at step s4, the information appropriate to the aforementioned condition from the storage device 8 and prepares the table of the secondary information with respect to the information which has already been read.

At step s5, the CPU 1 causes the CRT 3 to display the table of the secondary information prepared, as shown in FIG. 2b. In this case, the table of all the materials (test results of the article), each containing the name "electronic filing apparatus" as the keyword, is displayed on the CRT 3.

It is judged at step s6 whether or not the output of the desired material or materials should be reserved. In the case where the operator can guess the contents of the primary information from the table (FIG. 2b) of the secondary information displayed on the CRT 3 at step s6, the materials successively selectively designated by the cursor key and the reservation key are stored in the storage device 8 at step s7 for the output reservation of the display and printing thereof by virtue of the first output reservation means.

The CPU 1 judges at step s8 whether or not the pre-processing is necessary on the basis of the presence or absence of a pre-processing signal to be inputted by the operator using the pre-processing key. If the CPU 1 has judged that the pre-processing is necessary, the procedure proceeds to step s9 at which time the pre-processing is executed and through which the retrieval processing is caused to return to the previous step s2 (refer to FIG. 2a). In contrast, if the CPU 1 has not judged at step s8 that the pre-processing is necessary, the procedure proceeds to step s10.

The CPU 1 judges at step s10 whether or not the print reservation key has been depressed. If the CPU 1 has judged that the print reservation key has been depressed, the procedure proceeds to step s31, and if not, the procedure proceeds to step s11 at which time the CPU 1 judges whether or not the display reservation key has been depressed. If the display reservation key has been judged to be depressed at step s11, the procedure proceeds to step s21 at which time the primary information which has not been outputted yet is collectively displayed in steps following step s21. If not, the procedure proceeds to step s12 from which the primary information is displayed piece by piece.

At step s12, the operator designates the desired material from the table of the secondary information displayed, at step s5, on the CRT 3 as shown in FIG. 2b. After the cassette containing the desired material as shown in FIG. 2c has been inserted into the apparatus, the desired material number for example, <1> in FIG. 3b is designated with the use of the cursor key or the like at step s12 followed by step s13, at which time the primary information of the designated material number is displayed on the CRT 3 as shown in FIG. 2d.

When the operator has depressed the reservation key at step s14 upon confirmation of the primary information displayed on the CRT 3 as shown in FIG. 2d, the second output reservation means renders the storage device 8 to store therein the primary information at step s15 so that the printing of the primary information may be reserved. When the operator has not depressed the reservation key, the procedure proceeds to step s16 at which time the CPU 1 judges whether or not the retrieval end key has been depressed. If the retrieval end key has been depressed, the procedure proceeds to step s31, and if not, the procedure proceeds to step s17.

The CPU 1 judges at step s17 whether or not the next-page processing is necessary on the basis of ON or OFF of the next-page key. If the next-page processing is necessary, the procedure proceeds to step s18 through which the retrieval processing is caused to return to step s13. In this event, the primary information of a page next to the material being displayed as shown in FIG. 2d is displayed on the CRT 3. If the next-page processing is not necessary, the procedure proceeds to step s19.

When the next-page processing has been judged to be unnecessary at step s17, the CPU 1 judges at step s19 whether or not the pre-processing is necessary on the basis of ON or OFF of the pre-processing key or ON or OFF of the retrieval mode key similarly at step s10. If the pre-processing is necessary, the procedure proceeds to step s20 through which the retrieval processing is caused to return to step s5 at which time the table of the secondary information as shown in FIG. 2b is displayed on the CRT 3. If the pre-processing is not necessary, the retrieval processing is judged to have finished and the procedure proceeds to step s31.

Upon completion of the retrieval processing, the entire primary information which has not been displayed yet, and the display of which has been reserved, are, collectively displayed on the CRT 3 at steps s21 to s30. More specifically, in the entire primary information having reservation for its display, the first page of the first piece of the primary information is displayed on the CRT 3 at step s21. Upon key operation by the operator who has viewed the primary information displayed on the CRT 3, it is judged at step s22 whether or not the next-page key or the previous-page key has been depressed. At step s24 it is judged whether or not the next-document key or the previous-document key has been depressed. Further, at step s26 it is judged whether or not the reservation cancel key has been depressed, and at step s28 whether or not the pre-processing key has been depressed. In the case where the judgment at steps s22, s24, s26 and s28 is YES, the procedure proceeds respectively: to step s23 at which time the primary information of the next page or the previous page is displayed on the CRT 3; to step s25 at which time the first page of the primary information of the next document or the previous one having reservation for its display is displayed on the CRT 3; to step s27 at which time the reservation of the primary information is canceled, that is to say, the display of the primary information is omitted; and to step s29 through which the procedure is caused to return to step s5. If the judgment at step s28 is NO, the procedure proceeds to step s30 at which time it is judged whether or not the display reservation key is still ON. If the display reservation key is still ON, the procedure returns to step s22 to continue the display of the reservation, and if not, the procedure proceeds to step s31.

In this way, when the CPU 1 has finished the display of the reservation, it judges at step s31 whether or not the print reservation key has been depressed. If the print reservation key has not been judged to be depressed, the procedure immediately ends. On the contrary, if the print reservation key has been judged to be depressed, the procedure proceeds to step s32 at which the primary information, having the output reservation for the printing thereof, is collectively printed by the printer 9, and thereafter, the procedure ends.

From the foregoing, according to the electronic filing apparatus of the present invention, the following remarkable effects can be attained by virtue of the first and second output reservation means contained in the CPU 1.

When the table of the retrieved secondary information is being displayed on the CRT 3 (step s5), the operator can selectively make reservation for the display and printing of the corresponding primary information in the case where he can guess its content from the secondary information. Furthermore, when the primary information corresponding to the aforementioned secondary information is being displayed on the CRT 3 (step s13), the operator can selectively make reservation for the printing of the primary information. Upon completion of a series of the retrieval operations, the entire primary information, having reservation for its output, is collectively displayed on the CRT 3 and printed by the printer 9 (steps s21 to s30 and s32). Accordingly, it is not necessary to execute bothersome designation of material numbers with respect to each piece of the primary information on the basis of the table of the secondary information, which is unlike the conventional apparatus. The retrieval operations can be, therefore, speedily performed with a reduction in labor.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An information registering and retrieving apparatus for registering primary information of image signals converted from an original document or a plurality of documents and registering secondary information to correspond to the primary information for retrieval of the primary information, the apparatus retrieving any desired primary information by utilizing the corresponding registered secondary information and comprising:

a first output reservation means for reserving selected primary information corresponding to desired secondary information selected from a plurality of secondary information retrieved based upon an input retrieval condition, and for inhibiting an output of the selected primary information corresponding to the selected secondary information, to a printer;

a second output reservation means, operatively connected to said first output reservation means, for reserving selected desired primary information selected from a plurality of primary information corresponding to said selected secondary information, and for inhibiting an output of the selected desired primary information to said printer; and control means, operatively connected to said first and second output reservation means, for controlling said first and second output reservation means to uninhibit and output said selected primary information to said printer, upon completion of a retrieval process;

said printer, upon completion of a retrieval process receiving said uninhibited selected primary information and said printer printing said uninhibited selected primary information.

2. A method of registering primary information corresponding to image information obtained from each of a plurality of originals and secondary information corresponding to the primary information, and retrieving primary information corresponding to a desired original by the use of corresponding secondary information, said method comprising the steps of:

a. scanning each of said plurality of originals to generate primary information for each of said plurality of originals ;

b. sequentially storing said primary information for each of said plurality of originals;

c. displaying primary information for a sequentially stored next one of said plurality of originals;

d. inputting secondary information for said displayed primary information;

e. sequentially displaying primary information for each of said stored plurality of originals;

f. registering said inputted secondary information to correspond to selected of said sequentially displayed primary information of step (d);

g. repeating steps (c)–(f) to register secondary information corresponding to stored primary information for each of said plurality of originals;
h. inputting an instruction to access a retrieval mode;
i. displaying said registered secondary information in a tabular format;
j. selecting secondary information which corresponds to said original desired to be retrieved;
k. successively displaying primary information which has been previously registered as corresponding to said selected secondary information;
l. selecting primary information corresponding to said original desired to be retrieved;
m. reserving said selected primary information; and
n. outputting said reserved information obtained in step (m).

3. A method, as claimed in claim 2, wherein
said original document desired to be retrieved contains a plurality of pages of registered primary information;
said steps of (k)–(m) are repeated to reserve each of said plurality of pages; and
said reserved information of step (n) is not outputted until all of said pages have been reserved.

4. A method of registering primary information corresponding to image information obtained from each of a plurality of originals and secondary information corresponding to the primary information, said method comprising the steps of:
(a) scanning each of said plurality of originals to generate primary information for each of said plurality of originals;
(b) sequentially storing said primary information for each of said plurality of originals;
(c) displaying primary information for a sequentially stored next one of said plurality of originals;
(d) inputting secondary information for said displayed primary information;
(e) sequentially displaying primary information for each of said plurality of originals;
(f) registering said inputted second information to correspond to selected of said sequentially displayed primary information of step (d); and
(g) repeating steps (c)–(f) to register secondary information corresponding to stored primary information for each of said plurality of originals.

5. An apparatus for registering primary information corresponding to image information obtained from each of a plurality of originals and secondary information corresponding to the primary information, and retrieving primary information corresponding to a desired original by the use of corresponding secondary information, said apparatus comprising:
scanning means for scanning each of said plurality of originals to generate primary information for each of said plurality of originals;
memory means, responsive to said scanning means, for sequentially storing said generated primary information for each of said plurality of originals;
display means, operatively connected to said memory means, for displaying primary information for a sequentially next one of said plurality of originals;
input means, operatively connected to said display means, for inputting secondary information for said displayed primary information;
said display means sequentially displaying primary information for each of said stored plurality of originals;
storage means, responsive to said input means and said display means, for registering said inputted secondary information to correspond to selected of said sequentially displayed primary information;
said input and display means successively being operated to register secondary information corresponding to stored primary information for each of said plurality of originals, in said storage means;
said input means inputting an instruction to access a retrieval mode;
said display means displaying said registered secondary information in a tabular format in response to said instruction to enter a retrieval mode;
said input means selecting secondary information which corresponds to said original desired to be retrieved;
first output reservation means, connected to said input means, for controlling storage of said selected secondary information in said storage means and for inhibiting output, to a printing means, of primary information corresponding to said selected secondary information;
said storage means storing said selected secondary information;
said display means successively displaying primary information which has been previously registered as corresponding to said selected secondary information;
said input means selecting primary information corresponding to said original desired to be retrieved;
second output reservation means, connected to said input means, for controlling storing of said selected primary information in said storage means and for inhibiting output, to a printing means, of said selected primary information;
said storage means storing said selected primary information; and
control means, responsive to said storage means, for controlling said first and second output reservation means to uninhibit and output said selected primary information to said printing means;
said printing means, responsive to said control means, for outputting said stored selected primary information.

* * * * *